United States Patent
Aoki

(10) Patent No.: US 12,198,736 B2
(45) Date of Patent: Jan. 14, 2025

(54) DISK DEVICE AND HEAD GIMBAL ASSEMBLY HAVING DAMPER ON INCLINED SURFACE OF LOAD BEAM

(71) Applicants: Kabushiki Kaisha Toshiba, Tokyo (JP); Toshiba Electronic Devices & Storage Corporation, Tokyo (JP)

(72) Inventor: Kenichiro Aoki, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/453,518

(22) Filed: Aug. 22, 2023

(65) Prior Publication Data

US 2024/0221782 A1    Jul. 4, 2024

(30) Foreign Application Priority Data

Jan. 4, 2023  (JP) ................................. 2023-000019

(51) Int. Cl.
*G11B 5/48* (2006.01)
*G11B 33/08* (2006.01)

(52) U.S. Cl.
CPC ............ *G11B 5/4833* (2013.01); *G11B 33/08* (2013.01)

(58) Field of Classification Search
None
See application file for complete search history.

(56) References Cited

U.S. PATENT DOCUMENTS

| | | | |
|---|---|---|---|
| 8,432,641 B1 * | 4/2013 | Nguyen | G11B 5/4833 360/97.19 |
| 8,988,831 B1 | 3/2015 | Kido et al. | |
| 10,878,843 B2 | 12/2020 | Aoki | |
| 11,341,997 B2 | 5/2022 | Tokizaki | |
| 11,359,693 B2 | 6/2022 | Ee | |
| 2013/0155547 A1 * | 6/2013 | Eguchi et al. | G11B 5/4833 360/244 |

* cited by examiner

*Primary Examiner* — Craig A. Renner
(74) *Attorney, Agent, or Firm* — Kim & Stewart LLP

(57) ABSTRACT

According to one embodiment, a disk device includes a magnetic disk, an arm, a base, a flexure, a magnetic head, and damper. The base plate is attached to the arm away from a rotation axis in a first direction. The load beam is attached to the base plate, and has a second surface and a third surface. The flexure is attached to the second surface. The magnetic head is mounted on the flexure. The damper is attached to the third surface, and includes a first constrained layer and a second constrained layer. An end of the second constrained layer is located further away from the rotation axis than an end of the first constrained layer in the first direction, the ends of the first constrained layer and the second constrained layer being in a second direction opposite to the first direction.

14 Claims, 10 Drawing Sheets

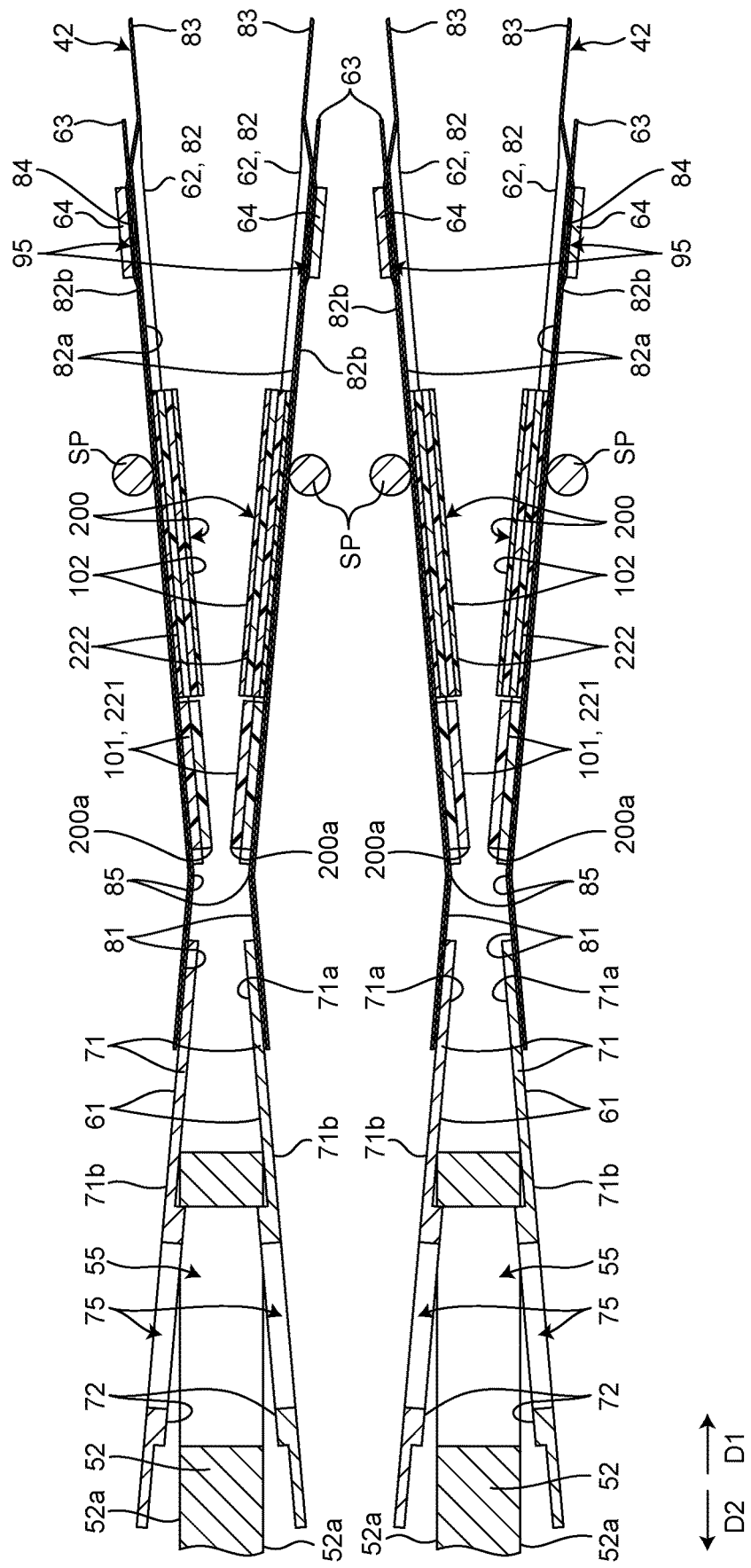

DISK DEVICE AND HEAD GIMBAL ASSEMBLY HAVING DAMPER ON INCLINED SURFACE OF LOAD BEAM

CROSS-REFERENCE TO RELATED APPLICATIONS

This application is based upon and claims the benefit of priority from Japanese Patent Application No. 2023-000019, filed on Jan. 4, 2023, the entire contents of which are incorporated herein by reference.

FIELD

Embodiments described herein relate generally to a disk device and a head gimbal assembly.

BACKGROUND

A disk device such as a hard disk drive typically includes head gimbal assemblies (HGA) and a carriage. The HGAs each include a magnetic head and are attached to an arm of the carriage. The carriage rotates to move the magnetic heads to their respective desired positions.

The positioning control of the magnetic head may be subjected to vibration of a load beam included in the HGA. For this reason, the disk device may additionally include a damper attached to the load beam. The damper works to attenuate the vibration of the load beam, if it occurs.

Two HGAs are attached to both sides of each arm. The dampers are attached to the load beam surfaces facing the other HGAs. Such arrangement may cause the dampers of the two HGAs attached to both sides of the arm to approach and interfere with each other.

BRIEF DESCRIPTION OF THE DRAWINGS

FIG. 10 is an exemplary cross-sectional view illustrating an HGA and an arm in a manufacturing process of the second embodiment.

DETAILED DESCRIPTION

In general, according to one embodiment, a disk device includes a magnetic disk, an arm, a base, a flexure, a magnetic head, and damper. The arm is configured to rotate about a rotation axis. The base plate has a first surface facing the arm, and is attached to the arm away from the rotation axis in a first direction orthogonal to the rotation axis. The load beam is attached to the base plate, and has a second surface and a third surface. The second surface faces the magnetic disk. The third surface is opposite the second surface and is inclined with respect to the first surface so as to be closer to the magnetic disk as is further away from the arm. The flexure is attached to the second surface. The magnetic head is mounted on the flexure further away from the rotation axis than the base plate in the first direction, and is configured to read and write information from and to the magnetic disk. The damper is attached to the third surface, and includes a first constrained layer and a second constrained layer. The second constrained layer is located further away from the load beam than the first constrained layer. An end of the second constrained layer is located further away from the rotation axis than an end of the first constrained layer in the first direction, the ends of the first constrained layer and the second constrained layer being in a second direction opposite to the first direction.

First Embodiment

Hereinafter, a first embodiment will be described with reference to FIGS. 1 to 7. In the present specification, components according to embodiments and descriptions of the components may be described in a plurality of expressions. The components and the description thereof are examples, and are not limited by the expression of the present specification. Components may also be identified with names different from those herein. In addition, the component may be described by an expression different from the expression in the present specification.

Figure 1:
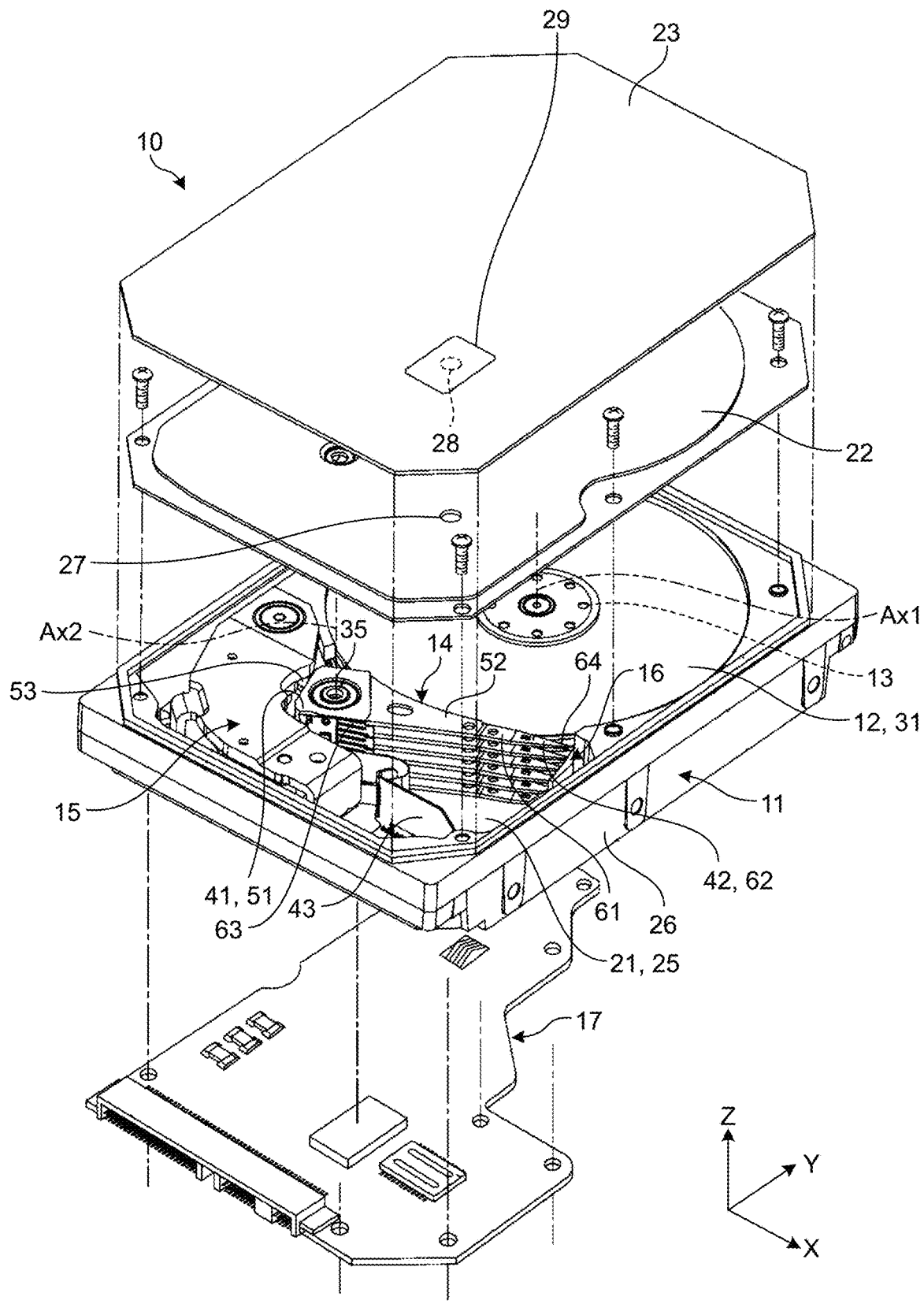
FIG. 1 is an exemplary perspective view illustrating an HDD according to a first embodiment in an exploded manner.

FIG. 1 is an exemplary perspective view illustrating a hard disk drive (HDD) 10 according to a first embodiment in an exploded manner. The HDD 10 is an example of a disk device, and may also be referred to as an electronic device, a storage device, an external storage device, or a magnetic disk device.

As illustrated in FIG. 1, in the present specification, an X axis, a Y axis, and a Z axis are defined for convenience. The X axis, the Y axis, and the Z axis are orthogonal to each other. The X axis is provided along the width of the HDD 10. The Y axis is provided along the length of the HDD 10. The Z axis is provided along the thickness of the HDD 10.

Furthermore, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. The HDD 10 is not limited to this example.

The housing 11 includes a base 21, an inner cover 22, and an outer cover 23. Each of the base 21, the inner cover 22, and the outer cover 23 is made of metal such as aluminum alloy, for example.

The base 21 has a substantially rectangular parallelepiped box shape opened in the +Z direction. The plurality of magnetic disks 12, the spindle motor 13, the HSA 14, the VCM 15, and the ramp load mechanism 16 are housed inside the base 21.

The base 21 has a bottom wall 25 and a side wall 26. The bottom wall 25 has a substantially rectangular (quadrangular) plate shape and stands substantially orthogonal to the Z direction. The side wall 26 protrudes in the substantially +Z direction from the edge of the bottom wall 25 and has a substantially rectangular frame shape. The bottom wall 25 and the side wall 26 are integrated together.

The inner cover 22 is attached to the end of the side wall 26 in the +Z direction with, for example, a screw. The outer cover 23 covers the inner cover 22 and is attached to the end of the side wall 26 in the +Z direction by welding, for example.

The inner cover 22 is provided with a vent 27. The outer cover 23 is provided with a vent 28. After the components are attached to the inside of the base 21 and the inner cover 22 and the outer cover 23 are attached to the base 21, the air is removed from inside the housing 11 through the vents 27 and 28. Furthermore, the housing 11 is filled with a gas different from air.

The gas filling the housing 11 is, for example, a low density gas having a density lower than air, an inert gas having low reactivity, or the like. For example, the housing 11 is filled with helium inside. The inside of the housing 11 may be filled with another fluid. The inside of the housing 11 may be maintained at vacuum, low pressure close to vacuum, or negative pressure lower than atmospheric pressure.

The vent 28 of the outer cover 23 is closed by a seal 29. The seal 29 airtightly seals the vent 28 and prevents the fluid filling the housing 11 from leaking from the vent 28.

The plurality of magnetic disks 12 are arranged orthogonally to the Z direction. The diameter of the magnetic disk 12 is, for example, about 3.5 inches. The HDD 10 according to the present embodiment includes, for example, 10 or more magnetic disks 12. The diameter and the number of the magnetic disks 12 are not limited to this example.

Each of the plurality of magnetic disks 12 has, for example, at least one recording surface 31. The recording surface 31 is provided on at least one of the upper surface and the lower surface of the magnetic disk 12. In other words, each of the plurality of recording surfaces 31 is a surface of the magnetic disk 12 facing substantially the +Z direction or a surface of the magnetic disk 12 facing substantially the −Z direction. The recording surface 31 is a substantially flat surface orthogonal to the Z direction. The magnetic recording layer of the magnetic disk 12 is provided on the recording surface 31.

The spindle motor 13 supports the plurality of magnetic disks 12 stacked at intervals in the Z direction. The spindle motor 13 rotates the plurality of magnetic disks 12 around an axis Ax1 of the spindle motor 13. The axis Ax1 extends in the Z direction. The plurality of magnetic disks 12 is held by the hub of the spindle motor 13 with, for example, a clamp spring.

The HSA 14 is rotatably supported by a support shaft 35. The support shaft 35 is provided away from the magnetic disk 12 in a direction orthogonal to the axis Ax1. The support shaft 35 extends, for example, in the substantially +Z direction from the bottom wall 25 of the housing 11.

The HSA 14 can rotate about an axis Ax2. The axis Ax2 is an example of a rotation axis and is a virtual axis extending in the Z direction. The axis Ax2 is, for example, the center of rotation of the HSA 14 and coincides with the axis of the support shaft 35.

Hereinafter, an axial direction, a radial direction, and a circumferential direction are defined for convenience. The axial direction is a direction along the axis Ax2. In the present embodiment, the axis Ax2 extends in the Z direction. Therefore, the axial direction includes the Z direction. The radial direction is a direction orthogonal to the axis Ax2, and includes a plurality of directions orthogonal to the axis Ax2. The circumferential direction is a rotational direction around the axis Ax2, and includes a clockwise direction around the axis Ax2 and a counterclockwise direction.

The HSA 14 includes a carriage 41, a plurality of head gimbal assemblies (HGA) 42, and a flexible printed circuit board (FPC) 43. The carriage 41 includes an actuator block 51, a plurality of arms 52, and a frame 53.

The actuator block 51, the plurality of arms 52, and the frame 53 are integrally formed of, for example, an aluminum alloy. The materials of the actuator block 51, the arms 52, and the frame 53 are not limited to this example.

The actuator block 51 is supported by the support shaft 35 via, for example, a bearing so as to be rotatable about the axis Ax2. The plurality of arms 52 protrude radially outward from the actuator block 51. Therefore, the plurality of arms 52 is rotatable about the axis Ax2. The HSA 14 may be divided, and the arm 52 may protrude from each of the plurality of actuator blocks 51.

The plurality of arms 52 is disposed at intervals in the axial direction. Each of the arms 52 has a plate shape to enter a gap between two adjacent magnetic disks 12. The plurality of arms 52 extend substantially in parallel.

In the present embodiment, the carriage 41 includes 11 arms 52. The number of the arms 52 is larger by one than the number of the magnetic disks 12. The number of the arms 52 is not limited to this example.

The frame 53 protrudes from the actuator block 51 in a direction opposite to the direction in which the arm 52 protrudes. The frame 53 holds a voice coil of the VCM 15. The VCM 15 includes the voice coil, a pair of yokes, and a magnet provided on the yoke.

Figure 2:
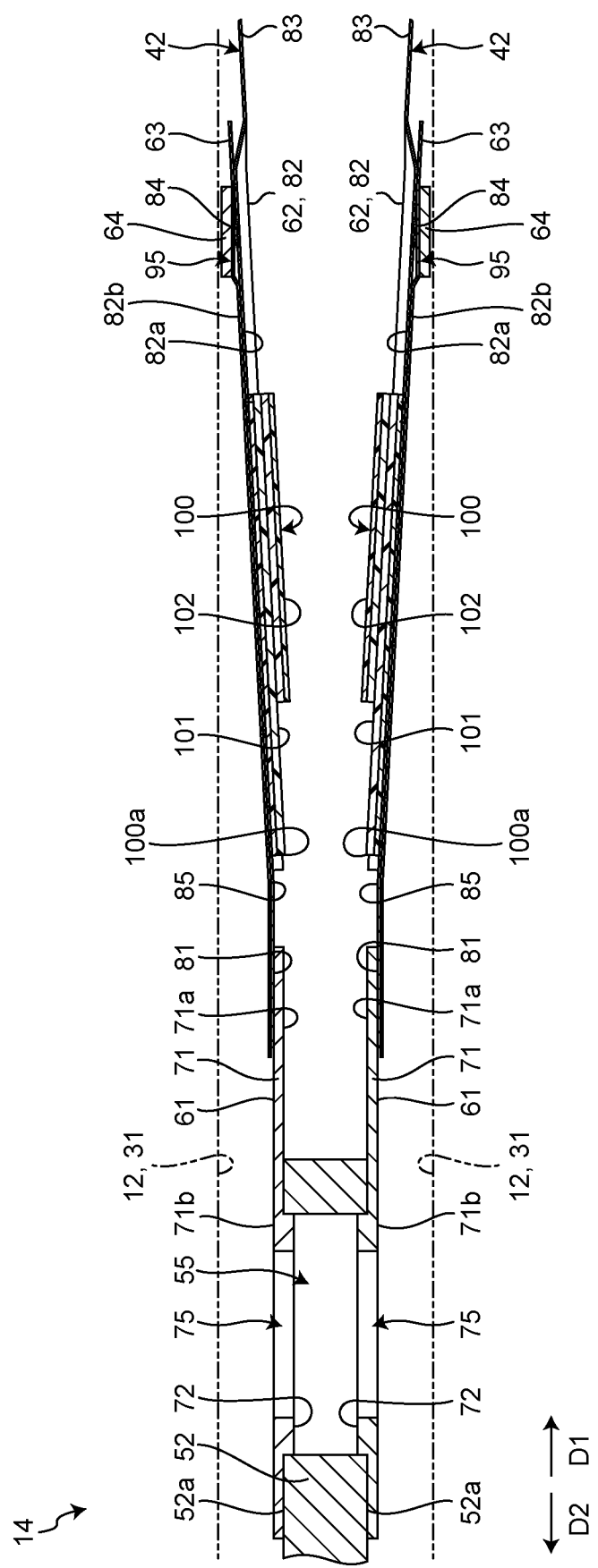
FIG. 2 is an exemplary cross-sectional view illustrating an HGA and an arm of the first embodiment.

FIG. 2 is an exemplary cross-sectional view illustrating the HGA 42 and the arm 52 of the first embodiment. As illustrated in FIG. 2, in the present specification, a first direction D1 and a second direction D2 are defined. The first direction D1 is one of a plurality of directions included in the radial direction, and is a direction facing outward in the radial direction. Therefore, the first direction D1 is a direction orthogonal to the axis Ax2. The second direction D2 is a direction opposite to the first direction D1. The first direction D1 is also an example of a first creeping direction. The second direction D2 is also an example of a second creeping direction.

The plurality of arms 52 protrude from the actuator block 51 in the first direction D1. That is, the first direction D1 and the second direction D2 are longitudinal directions of the arm 52. As the arm 52 rotates about the axis Ax2, the first direction D1 and the second direction D2 also rotate about the axis Ax2. The frame 53 protrudes from the actuator block 51 in the second direction D2.

Each of the plurality of arms 52 has two attachment surfaces 52a. The two attachment surfaces 52a are located at the end of the arm 52 in the first direction D1 and are flat substantially orthogonal to the axis Ax2. One of the attachment surfaces 52a faces the +Z direction, and the other attachment surface 52a faces the −Z direction. When the arm 52 is located between two adjacent magnetic disks 12, the attachment surface 52a faces the recording surface 31 of the magnetic disk 12.

Each arm 52 is provided with a through hole 55. The through hole 55 is a substantially circular hole penetrating the arm 52 in the axial direction. Thus, the through hole 55 opens to the two attachment surfaces 52a.

The plurality of HGAs 42 is attached to the end of the corresponding arms 52 in the first direction D1, and extends from the arms 52 in the first direction D1. As a result, the plurality of HGAs 42 is arranged at intervals in the axial direction.

Figure 3:
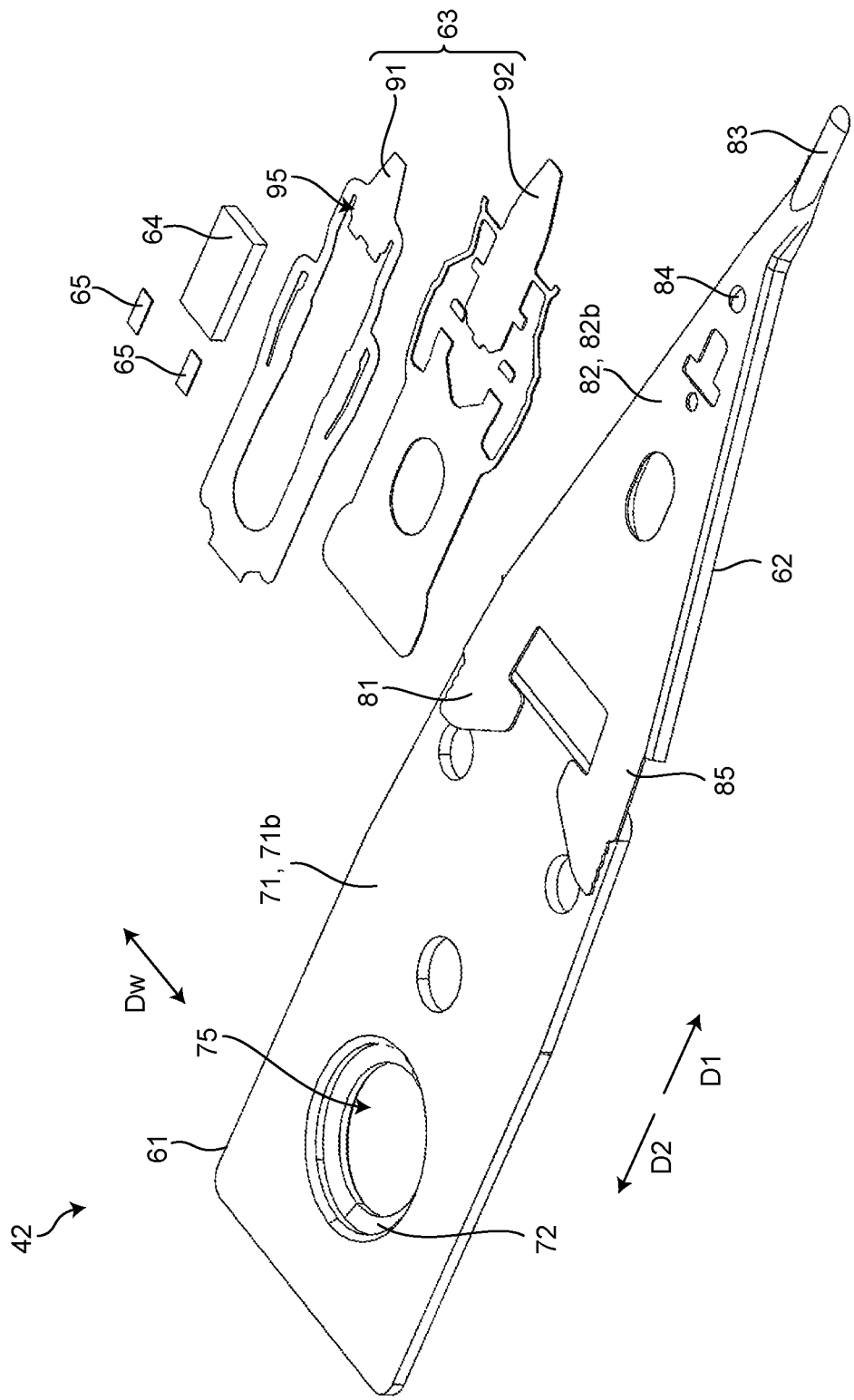
FIG. 3 is an exemplary perspective view illustrating the HGA of the first embodiment in an exploded manner.
Figure 4:
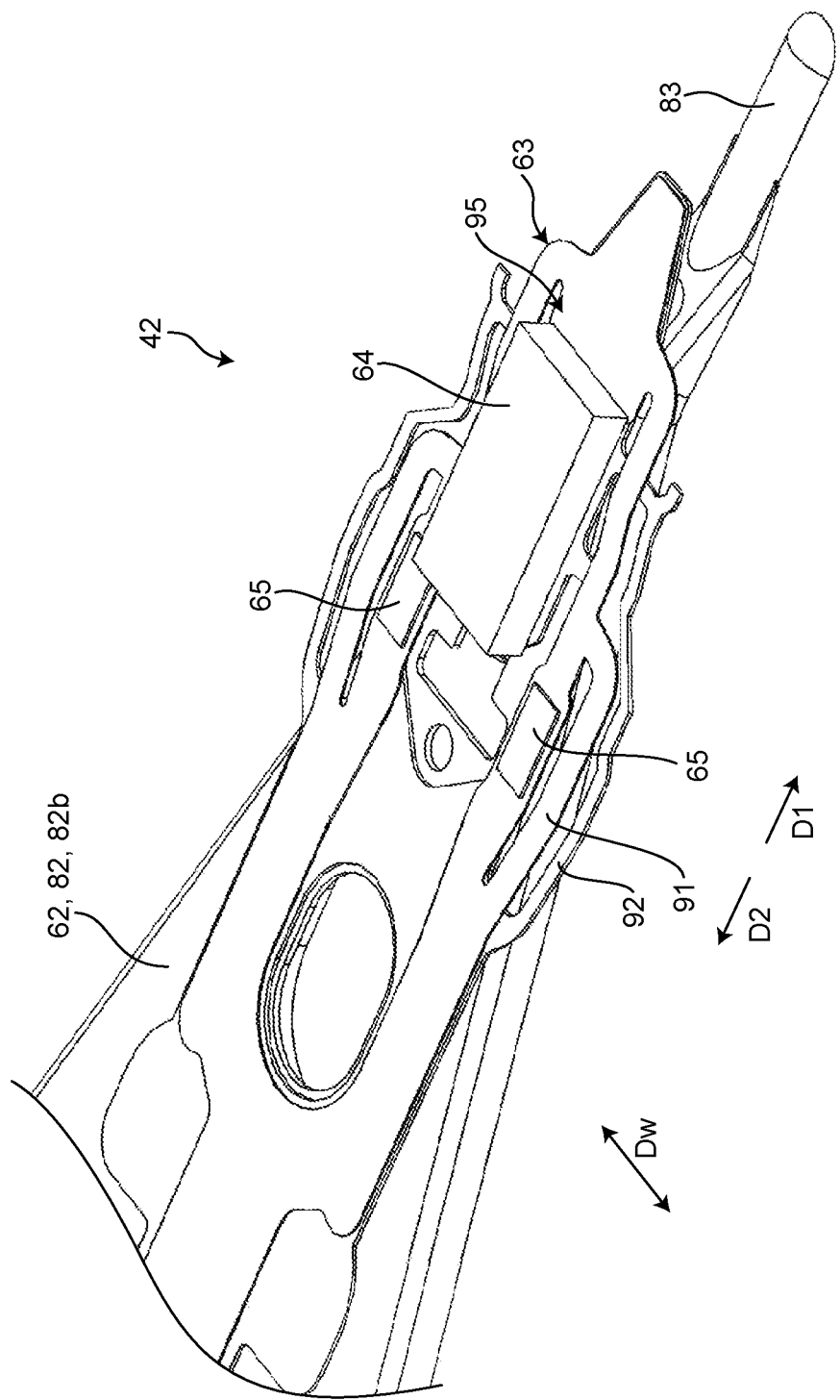
FIG. 4 is an exemplary perspective view illustrating a part of the HGA of the first embodiment.

FIG. 3 is an exemplary perspective view illustrating the HGA 42 of the first embodiment in an exploded manner. FIG. 4 is an exemplary perspective view illustrating a part of the HGA 42 of the first embodiment. As illustrated in FIG. 3, each of the plurality of HGAs 42 includes a base plate 61, a load beam 62, a flexure 63, a magnetic head 64, and two piezoelectric elements 65. The magnetic head 64 may also be referred to as a slider. The piezoelectric element 65 may also be referred to as an actuator.

The base plate 61 and the load beam 62 are made of, for example, stainless steel. The base plate 61 and the load beam 62 may be made of other materials or may be made of materials different from each other.

As illustrated in FIG. 2, the base plate 61 is attached to the attachment surface 52a of the arm 52. Specifically, the base plate 61 is attached to the arm 52 away from the axis Ax2 in the first direction D1.

The base plate 61 includes a plate 71 and a boss 72. The plate 71 has a substantially rectangular plate shape. The plate 71 has an inner side surface 71a and an outer side surface 71b. The inner side surface 71a is an example of a first surface and a first outer surface. The outer side surface 71b is an example of a second outer surface. The boss 72 is an example of the protrusion.

The inner side surface 71a is substantially flat and faces the attachment surface 52a of the corresponding arm 52. The inner side surface 71a is supported by the attachment surface 52a. The outer side surface 71b is opposite the inner side surface 71a. The outer side surface 71b is substantially flat and faces the recording surface 31 of the corresponding magnetic disk 12. The inner side surface 71a and the outer side surface 71b are arranged substantially orthogonally to the axis Ax2. Thus, the first direction D1 and the second direction D2 are directions along the inner side surface 71a and along the outer side surface 71b.

The boss 72 protrudes from the inner side surface 71a to be inserted into the through hole 55. The base plate 61 is provided with a through hole 75 axially penetrating the plate 71 and the boss 72. The boss 72 is fixed to the inner surface of the arm 52 forming the through hole 55 by, for example, caulking. Thus, the base plate 61 is attached to the arm 52.

The load beam 62 illustrated in FIG. 3 has a plate shape thinner than the plate 71 of the base plate 61. The load beam 62 is attached to an end of the plate 71 in the first direction D1 and extends from the plate 71 approximately in the first direction D1.

The load beam 62 includes an attachment part 81, an extending part 82, a lift tab 83, and a dimple 84. The attachment part 81 is attached to the plate 71 by welding, for example. The extending part 82 extends from an end of the attachment part 81 in the first direction D1.

The extending part 82 has a substantially triangular plate shape tapered in the first direction D1. As illustrated in FIG. 2, the extending part 82 extends obliquely with respect to the inner side surface 71a of the plate 71 from the attachment part 81 toward the corresponding magnetic disk 12. In other words, the extending part 82 extends from the plate 71 in a direction between the first direction D1 and a direction which the outer side surface 71b of the plate 71 faces. That is, the load beam 62 is bent at the boundary 85 between the attachment part 81 and the extending part 82. The load beam 62 is not limited to this example.

The extending part 82 has an inner side surface 82a and an outer side surface 82b. The inner side surface 82a is an example of a third surface and a third outer surface. The outer side surface 82b is an example of a second surface and a fourth outer surface. The inner side surface 82a and the outer side surface 82b are substantially flat and are opposite to each other.

The inner side surface 82a and the outer side surface 82b are inclined with respect to the inner side surface 71a of the plate 71 so as to be closer to the magnetic disk 12 as is further away from the arm 52. The inner side surface 82a faces in a direction between the first direction D1 and the direction in which the inner side surface 71a of the plate 71 faces. The outer side surface 82b faces in a direction between the second direction D2 and a direction in which the outer side surface 71b of the plate 71 faces. The outer side surface 82b faces the recording surface 31 of the corresponding magnetic disk 12.

The lift tab 83 is provided at an end of the extending part 82 in the first direction D1. As illustrated in FIG. 3, the dimple 84 is located near the lift tab 83. The dimple 84 is a substantially hemispherical protrusion protruding from the outer side surface 82b of the extending part 82.

As illustrated in FIG. 4, the flexure 63 has an elongated belt shape, and extends substantially in the radial direction along the arm 52, the base plate 61, and the load beam 62. The flexure 63 includes, for example, an FPC 91 and a backing layer 92.

The FPC 91 of the flexure 63 includes, for example, an insulating base layer, a conductive layer stacked on the base layer, and an insulating cover layer covering the conductive layer. The conductive layer of the FPC 91 includes a plurality of sets of wiring and a plurality of terminals. The FPC 91 is not limited to this example. The backing layer 92 is, for example, a flexible plate made of stainless steel. The backing layer 92 is attached to the base layer of the FPC 91 with, for example, an adhesive.

The flexure 63 includes a gimbal 95 (elastic support). The gimbal 95 is provided at an end of the flexure 63 in the first direction D1. The gimbal 95 is attached to the load beam 62 and is displaceable relative to the load beam 62. The gimbal 95 includes a part of the FPC 91 and a part of the backing layer 92. In the gimbal 95, the backing layer 92 is located between the FPC 91 and the load beam 62.

Figure 5:
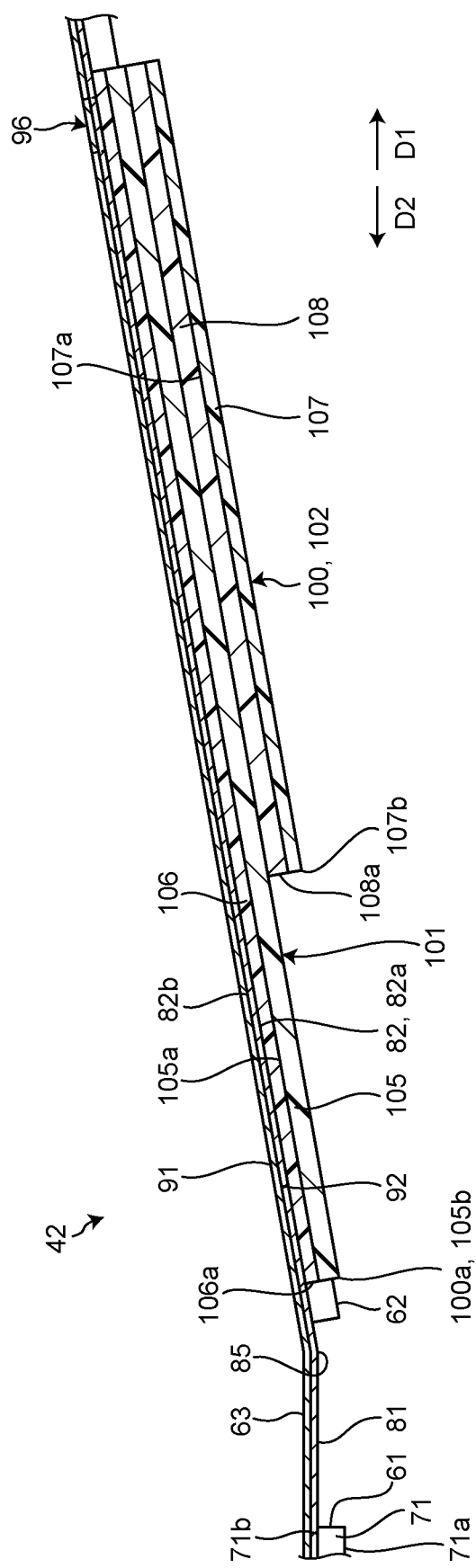
FIG. 5 is an exemplary cross-sectional view illustrating a part of the HGA of the first embodiment.

FIG. 5 is an exemplary cross-sectional view illustrating a part of the HGA 42 of the first embodiment. As illustrated in FIG. 5, the backing layer 92 of the flexure 63 is attached to the outer side surface 82b of the extending part 82 at the plurality of joints 96. At the joints 96, the load beam 62 and the backing layer 92 of the flexure 63 are joined together by spot welding, for example.

As illustrated in FIG. 1, an end of the flexure 63 in the second direction D2 is connected to one end of the FPC 43, for example, on the actuator block 51. The other end of the FPC 43 is connected to a connector provided on the bottom wall 25.

As illustrated in FIG. 4, the magnetic head 64 is mounted on the gimbal 95. In other words, the magnetic head 64 is mounted on the flexure 63 away from the axis Ax2 in the first direction D1 with respect to the base plate 61.

For example, the terminal of the FPC 91 is exposed in the gimbal 95. An electrode of the magnetic head 64 is bonded to the terminal by, for example, soldering. Thus, the FPC 91 of the flexure 63 is electrically connected to the magnetic head 64. For example, the bonding between the magnetic head 64 and the gimbal 95 may be reinforced with an adhesive. Further, the FPC 43 is electrically connected to the magnetic head 64 via the FPC 91 of the flexure 63.

The magnetic heads 64 record and reproduce information on and from the corresponding recording surfaces 31 of the plurality of magnetic disks 12. In other words, the magnetic heads 64 read and write information from and to the magnetic disks 12.

Each magnetic head 64 is supported by the dimple 84. As a result, the magnetic head 64 mounted on the gimbal 95 can rotate around the dimple 84 with respect to the load beam 62.

The piezoelectric element 65 is mounted on the gimbal 95. For example, the piezoelectric element 65 is bonded to a terminal provided on the FPC 91 of the gimbal 95 by soldering or with a conductive adhesive. Thus, the FPC 91 of the flexure 63 is electrically connected to the piezoelectric element 65.

Figure 6:
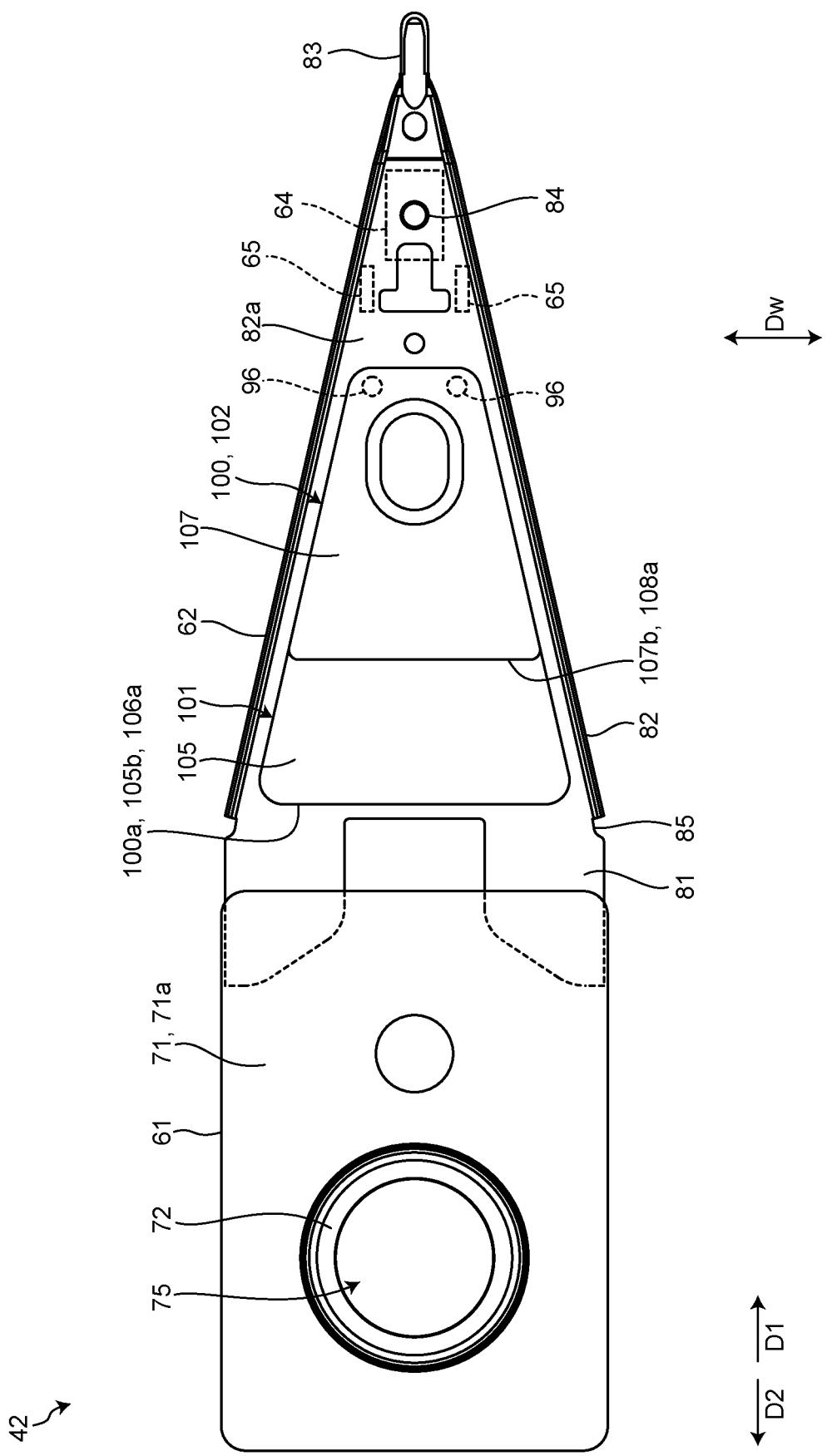
FIG. 6 is an exemplary plan view illustrating the HGA of the first embodiment.

FIG. 6 is an exemplary plan view illustrating the HGA 42 of the first embodiment. As illustrated in FIG. 6, at least a part of the piezoelectric element 65 is located between the base plate 61 and the magnetic head 64 in the first direction D1. The piezoelectric element 65 may be aligned with the magnetic head 64 in a width direction Dw along the inner side surface 82a and orthogonal to the first direction D1. The plurality of joints 96 are located between the base plate 61 and the piezoelectric element 65 in the first direction. The position of the piezoelectric element 65 is not limited to this example.

The piezoelectric element 65 can expand and contract in the first direction D1 or the second direction D2 according to the applied voltage. Along with expansion and contraction of the two piezoelectric elements 65, the magnetic head 64 mounted on the gimbal 95 rotates, for example, in a substantially circumferential direction (seek direction).

The VCM 15 illustrated in FIG. 1 rotates the carriage 41 about the axis Ax2. As the carriage 41 rotates, the HGA 42 attached to the arm 52 rotates. The carriage 41 rotates about the axis Ax2 to move the magnetic head 64 to a desired position along the recording surface 31 of the magnetic disk 12.

The magnetic head 64 moves to the outermost periphery of the magnetic disk 12 by the rotation of the carriage 41 by the VCM 15, and the ramp load mechanism 16 holds the magnetic head 64 at the unload position by supporting the lift tab 83. At the unload position, the magnetic head 64 is separated from the magnetic disk 12.

The PCB 17 is, for example, a rigid board such as a glass epoxy board, a multilayer board, or a build-up board. The PCB 17 is attached to the bottom wall 25 of the base 21 outside the housing 11.

Various electronic components such as a relay connector connected to the FPC 43, an interface (I/F) connector connected to the host computer, and a controller that controls the operation of the HDD 10 are mounted on the PCB 17. The relay connector is electrically connected to the FPC 43 via a connector provided on the bottom wall 25.

As illustrated in FIG. 6, the HGA 42 further includes a damper 100. The damper 100 is attached to the inner side surface 82a of the extending part 82. As illustrated in FIG. 5, the damper 100 includes a first damper 101 and a second damper 102 overlaid on the first damper 101.

The first damper 101 is attached to the inner side surface 82a of the extending part 82 to attenuate vibration of the extending part 82. The second damper 102 is attached to the first damper 101 to attenuate vibration of the first damper 101 and vibration of the extending part 82 via the first damper 101.

As illustrated in FIG. 5, the first damper 101 includes a first constrained layer 105 and a first viscoelastic material (VEM) 106. The second damper 102 includes a second constrained layer 107 and a second viscoelastic material 108.

The first constrained layer 105 and the second constrained layer 107 are, for example, plates made of resin or metal and disposed along the inner side surface 82a of the extending part 82. The material of the first constrained layer 105 may be different from or the same as the material of the second constrained layer 107.

In the direction orthogonal to the inner side surface 82a, the first constrained layer 105 is different in thickness from the second constrained layer 107. The first constrained layer 105 and the second constrained layer 107 may have the same thickness.

The first viscoelastic material 106 and the second viscoelastic material 108 are made of, for example, a polymer material. Each of the first viscoelastic material 106 and the second viscoelastic material 108 has lower rigidity than either of the first constrained layer 105 and the second constrained layer 107.

The first viscoelastic material 106 is made of a different material from the second viscoelastic material 108. For example, the first viscoelastic material 106 has more excellent damping characteristics than the second viscoelastic material 108 at a relatively low temperature. On the other hand, the second viscoelastic material 108 has more excellent damping characteristics than the first viscoelastic material 106 at a relatively high temperature. The damping characteristics of the first viscoelastic material 106 and the second viscoelastic material 108 are not limited to this example.

A difference in viscosity between the first viscoelastic material 106 and the second viscoelastic material 108 differ at a predetermined, relatively low temperature and at a predetermined, relatively high temperature. The predetermined, relatively low temperature is an example of a first temperature. The predetermined, relatively high temperature is an example of a second temperature.

In the direction orthogonal to the inner side surface 82a, the thickness of the first viscoelastic material 106 is different from the thickness of the second viscoelastic material 108. The first viscoelastic material 106 and the second viscoelastic material 108 may be made of the same material and/or have the same thickness.

The first viscoelastic material 106 is interposed between the first constrained layer 105 and the inner side surface 82a of the extending part 82. The first viscoelastic material 106 adheres to the first constrained layer 105 and to the inner side surface 82a.

The second viscoelastic material 108 is interposed between the first constrained layer 105 and the second constrained layer 107. The second viscoelastic material 108 adheres to the first constrained layer 105 and to the second constrained layer 107.

The first constrained layer 105 and the second viscoelastic material 108 are located between the first viscoelastic material 106 and the second constrained layer 107. The second constrained layer 107 is more spaced apart from the load beam 62 than the first constrained layer 105.

Vibration of the extending part 82, if it occurs, is transmitted to the first constrained layer 105 through the first viscoelastic material 106. The vibration of the first constrained layer 105 with respect to the extending part 82 causes the first viscoelastic material 106 to deform between the extending part 82 and the first constrained layer 105 and transform energy of the vibration into heat. In this manner, the first damper 101 attenuates the vibration of the extending part 82.

The vibration of the extending part 82 is transmitted to the second constrained layer 107 through the first viscoelastic material 106, the first constrained layer 105, and the second viscoelastic material 108. The vibration of the second constrained layer 107 with respect to the first constrained layer 105 causes the second viscoelastic material 108 to deform between the first constrained layer 105 and the second constrained layer 107 and transform energy of the vibration into heat. In this manner, the second damper 102 attenuates the vibration of the extending part 82 via the first damper 101.

The first constrained layer 105 has a first attached surface 105a. The first attached surface 105a is substantially flat and faces the inner side surface 82a of the extending part 82. The first viscoelastic material 106 is attached to the first attached surface 105a.

The second constrained layer 107 has a second attached surface 107a. The second attached surface 107a is substantially flat and faces the first constrained layer 105. Further, the second attached surface 107a faces the inner side surface 82a via the first constrained layer 105.

When viewed in a direction orthogonal to the inner side surface 82a, the projection surface of the first constrained layer 105 substantially matches the first attached surface 105a. The projection surface of the second constrained layer 107 substantially matches the second attached surface 107a.

In the first embodiment, the second constrained layer 107 is smaller in size than the first constrained layer 105. The second attached surface 107a is thus smaller in size than the first attached surface 105a. The sizes of the first constrained layer 105 and the second constrained layer 107 are not limited to this example.

When viewed in a direction orthogonal to the inner side surface 82a, the projection surface of the first constrained layer 105 substantially matches the projection surface of the first viscoelastic material 106. The projection surface of the second constrained layer 107 substantially matches the projection surface of the second viscoelastic material 108.

The projection surfaces of the first constrained layer 105, the first viscoelastic material 106, the second constrained layer 107, and the second viscoelastic material 108 have a substantially trapezoidal shape tapered in the first direction D1. The shapes of the first constrained layer 105, the first viscoelastic material 106, the second constrained layer 107, and the second viscoelastic material 108 are not limited to this example.

As illustrated in FIG. 6, the end 105b of the first constrained layer 105 in the second direction D2 extends substantially linearly in the width direction Dw. The end 107b of the second constrained layer 107 in the second direction D2 also extends substantially linearly in the width direction Dw.

The end 107b of the second constrained layer 107 is located further away from the base plate 61 than the end 105b of the first constrained layer 105 in the first direction D1. In other words, the end 107b of the second constrained layer 107 is more separated from the axis Ax2 than the end 105b of the first constrained layer 105 in the first direction D1. Further, the end 108a of the second viscoelastic material 108 in the second direction D2 is located further away from the axis Ax2 in the first direction D1 than the end 106a of the first viscoelastic material 106 in the second direction D2. As such, between the end 107b of the second constrained layer 107 and the end 105b of the first constrained layer 105, the first constrained layer 105 is not covered with either the second constrained layer 107 or the second viscoelastic material 108 but exposed.

At the end 100a of the damper 100 in the second direction D2, the number of the individual dampers (the first damper 101 and the second damper 102) included in the damper 100 and overlapping the load beam 62 is smaller than the total number of the individual dampers included in the damper 100. That is, the total number of the individual dampers (the first damper 101 and the second damper 102) included in the damper 100 is two, and the number of dampers (the first damper 101) overlapping the load beam 62 at the end 100a of the damper 100 is one.

The end 105b of the first constrained layer 105 and the end 107b of the second constrained layer 107 may not extend linearly. In this case, a portion of the end 107b of the second constrained layer 107 closest to the axis Ax2 is further away from the axis Ax2 in the first direction than a portion of the end 105b of the first constrained layer 105 closest to the axis Ax2.

The second constrained layer 107 covers a closest one of the plurality of joints 96 relative to the piezoelectric element 65 via the first constrained layer 105, the first viscoelastic material 106, and the second viscoelastic material 108. The damper 100 may further cover another one of the joints 96.

In the HDD 10 described above, for example, a controller of the PCB 17 controls the VCM 15 via, for example, the FPC 43, and controls the magnetic head 64 and the piezoelectric element 65 via the FPC 43 and the flexure 63.

The controller of the PCB 17 rotates the carriage 41 by the VCM 15 to move the magnetic head 64 to a desired position on the recording surface 31 of the magnetic disk 12. Furthermore, the controller of the PCB 17 adjusts the position of the magnetic head 64 by causing the two piezoelectric elements 65 to expand and contract.

By expanding and contracting, the piezoelectric elements 65 transmit the excitation force to the load beam 62 via the joint 96. Due to the excitation force, the load beam 62 may vibrate in a twisted manner. The damper 100, however, attenuates the vibration of the load beam 62.

Hereinafter, a method of attaching the HGA 42 to the arm 52, which is a part of the method of manufacturing the HDD 10, will be exemplified with reference to FIG. 7. The method of attaching the HGA 42 to the arm 52 is not limited to the following method, and other methods may be used.

Figure 7:
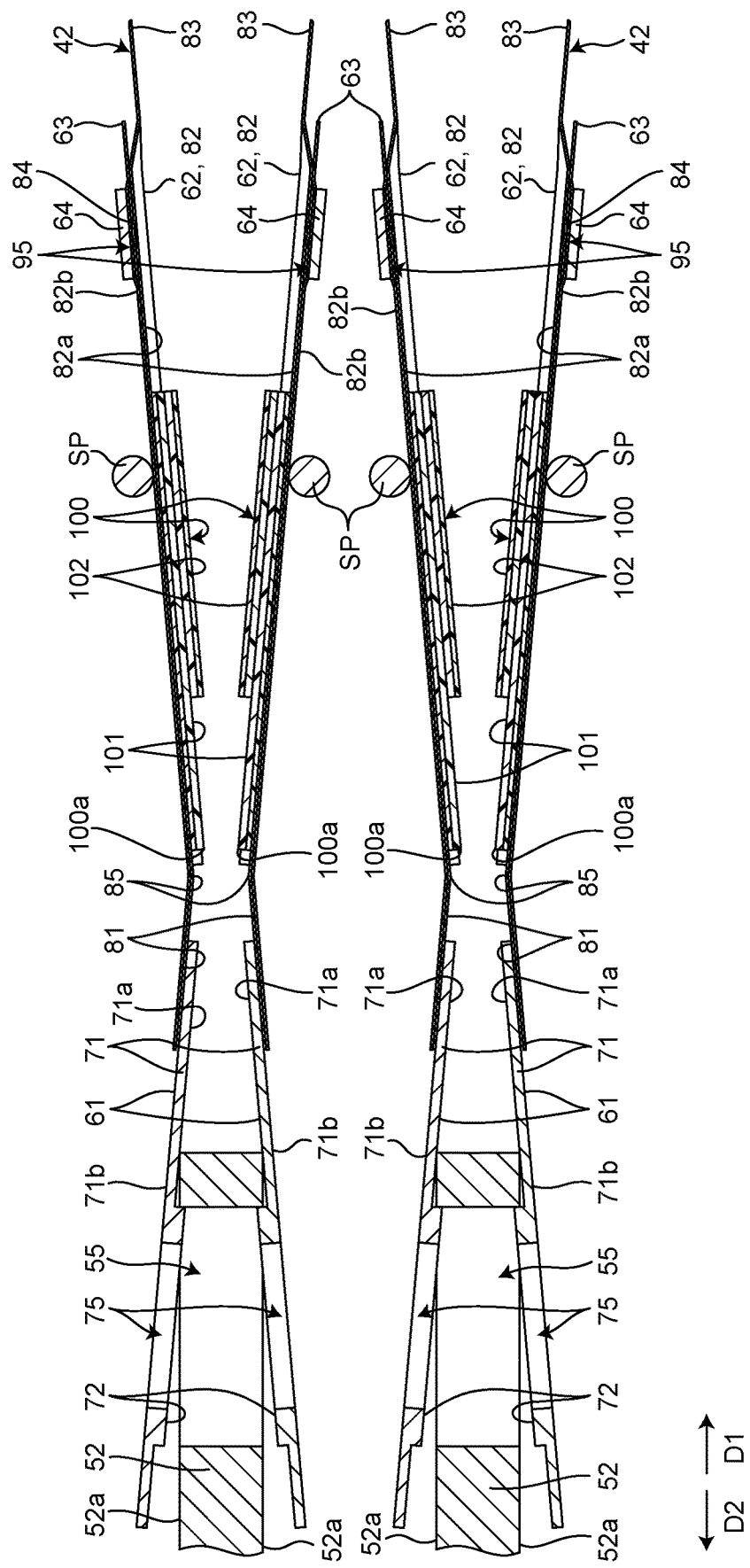
FIG. 7 is an exemplary cross-sectional view illustrating the HGA and the arm in a manufacturing process of the first embodiment.

FIG. 7 is an exemplary cross-sectional view illustrating the HGA 42 and the arm 52 in the manufacturing process of the first embodiment. As illustrated in FIG. 7, when the HGA 42 is attached to the arm 52, the base plate 61 is disposed on the attachment surface 52a of the arm 52.

The boss 72 of the base plate 61 is at least partially inserted into the through hole 55 of the arm 52. At least an end of the boss 72 in the first direction D1 is hooked on the inner surface of the arm 52. Furthermore, at least the end of the attachment surface 52a in the first direction D1 supports the inner side surface 71a of the plate 71.

Each of the HGAs 42 is supported by a separate pin SP. The separate pin SP is, for example, a bar-shaped jig extending in the width direction Dw. The separate pin SP is in contact with, for example, the flexure 63 to support the HGA 42.

The separate pins SP maintain an interval between the two HGAs 42 arranged on the two arms 52. Thereby, the separate pins SP prevent the magnetic heads 64 of the two HGAs 42 arranged on the two arms 52 from interfering with each other.

Being supported by the separate pin SP, the HGA 42 may be inclined with respect to the attachment surface 52a of the arm 52. For example, the plate 71 of the base plate 61 is inclined with respect to the attachment surface 52a of the arm 52 in such a manner that it is closer to another HGA 42 placed on the same arm 52 as is further away from the arm 52.

Due to the inclination of one of the two HGAs 42 on the same arm 52, for example, the two HGAs 42 become closest to each other in the vicinity of the boundary 85 between the attachment part 81 and the extending part 82 of the load beam 62. In the present embodiment, the end 100a of the damper 100 in the second direction D2 is located near the boundary 85. Thus, the two HGAs 42 are closest to each other at the end 100a of the damper 100 in the second direction D2. The two HGAs 42 may be closest to each other in another location.

At the end 100a of the damper 100 in the second direction D2, the first constrained layer 105 is not covered with either of the second constrained layer 107 and the second viscoelastic material 108 but exposed. Because of this, the end 100a of the damper 100 has a relatively small thickness in the direction orthogonal to the inner side surface 82a of the extending part 82.

The small thickness of the end 100a of the damper 100 allows a relatively long distance between the dampers 100 of the two HGAs 42 to be set. This makes it possible to prevent the dampers 100 of the two HGAs 42 arranged on the same arm 52 from interfering with each other.

Next, for example, the plate 71 is pressed against the attachment surface 52a of the arm 52 with a jig to insert the entire boss 72 into the through hole 55. Further, by inserting another jig into the through hole 75 of the base plate 61, the boss 72 is caulked to the inner surface of the arm 52. As a result, the HGA 42 is attached to the arm 52. After the HGA 42 is attached to the arm 52, the separate pin SP is removed from the HDD 10.

In the HDD 10 according to the first embodiment described above, the base plate 61 is attached to the arm 52 away from the axis Ax2 of the arm 52 in the first direction D1 orthogonal to the axis Ax2. The base plate 61 has the inner side surface 71a facing the arm 52. The load beam 62 is attached to the base plate 61 and has the outer side surface 82b and the inner side surface 82a. The outer side surface 82b faces the magnetic disk 12. The inner side surface 82a is opposite the outer side surface 82b, and is inclined with respect to the inner side surface 71a so as to be closer to the magnetic disk 12 as is further away from the arm 52. The damper 100 includes the first constrained layer 105 and the second constrained layer 107 and is attached to the inner side surface 82a of the load beam 62. The second constrained layer 107 is spaced further apart from the load beam 62 than the first constrained layer 105. The end 107b of the second constrained layer 107 and the end 105b of the first constrained layer 105 are in the second direction D2 opposite to the first direction D1. The end 107b of the second constrained layer 107 is located further away from the axis Ax2 than the end 105b of the first constrained layer 105 in the first direction D1. To attach two HGAs 42 to the arm 52, the HGAs 42 are disposed on both attachment surfaces 52a of the arm 52. At a position apart from the arm 52 in the first direction D1, the separate pins SP hold the load beams 62 of the two HGAs 42 in a manner that the load beams 62 approach each other. There may be a situation that the two HGAs 42 may become closest to each other at the end 100a of the damper 100 in the second direction D2. However, at the end 100a of the damper 100 in the second direction D2, the second constrained layer 107 does not cover the first constrained layer 105, therefore, the damper 100 decreases in thickness at the end 100a. Because of this, the HDD 10 can prevent the dampers 100 of the two HGAs 42 from interfering with each other.

The first viscoelastic material 106 is interposed between the first constrained layer 105 and the inner side surface 82a of the load beam 62. The second viscoelastic material 108 is interposed between the first constrained layer 105 and the second constrained layer 107. The end 106a of the first viscoelastic material 106 and the end 108a of the second viscoelastic material 108 are in the second direction D2. The end 108a of the second viscoelastic material 108 is located further away from the axis Ax2 than the end 106a of the first viscoelastic material 106 in the first direction D1. At the end 100a of the damper 100 in the second direction D2, the second viscoelastic material 108 does not cover the first constrained layer 105, therefore, the damper 100 decreases in thickness at the end 100a. This makes it possible to prevent the dampers 100 of the two HGAs 42 from interfering with each other in the HDD 10.

The first constrained layer 105 has a first attached surface 105a facing the inner side surface 82a. The second constrained layer 107 has a second attached surface 107a facing the first constrained layer 105 and being smaller in size than the first attached surface 105a. That is, in the direction orthogonal to the inner side surface 82a, the second constrained layer 107 has a smaller projected area than the first constrained layer 105. Thereby, the HDD 10 enables downsizing of the damper 100.

The piezoelectric element 65 is mounted on the flexure 63. The expansion and contraction of the piezoelectric element 65 may cause the load beam 62 to vibrate via the flexure 63. However, the damper 100 can attenuate the vibration of the load beam 62. According to the HDD 10, thus, the vibration caused by the piezoelectric element 65 can be attenuated by the damper 100, and the dampers 100 of the two HGAs 42 can be prevented from interfering with each other.

The plurality of joints 96 is located between the base plate 61 and the piezoelectric element 65. At the joints 96, the load beam 62 and the flexure 63 are joined together. The second constrained layer 107 covers a closest one of the plurality of joints 96 relative to the piezoelectric element 65 via the first constrained layer 105, the first viscoelastic material 106, and the second viscoelastic material 108. Vibration caused by the piezoelectric element 65 is transmitted from the flexure 63 to the load beam 62 through the joint 96 closest to the piezoelectric element 65. Furthermore, the nodes of vibration caused by the piezoelectric element 65 are in the periphery of the joint 96 closest to the piezoelectric element 65. In this regard, the two-layered damper 100 including the first constrained layer 105, the first viscoelastic material 106, the second constrained layer 107, and the second viscoelastic material 108 covers the joint 96 closest to the piezoelectric element 65, to be able to more effectively attenuate the vibration due to the piezoelectric element 65.

The first viscoelastic material 106 is made of a different material from the second viscoelastic material 108. As a result, the damper 100 can more efficiently attenuate vibration under different conditions, for example.

The difference in viscosity between the first viscoelastic material 106 and the second viscoelastic material 108 differs at a predetermined low temperature (first temperature) and at a predetermined high temperature (second temperature) different from the first temperature. Thus, the first viscoelastic material 106 and the second viscoelastic material 108 exhibit different characteristics, for example, at higher temperatures and at lower temperatures. As a result, the damper 100 can more efficiently attenuate the vibration in a wider range of temperature.

In the direction orthogonal to the inner side surface 82a, the first viscoelastic material 106 and the second viscoelastic material 108 have mutually different thicknesses. The performance of the damper 100 can be affected by the thicknesses of the first viscoelastic material 106 and the second viscoelastic material 108. In this regard, the HDD 10 enables appropriate setting of the performance of the damper 100.

In the direction orthogonal to the inner side surface 82a, the first constrained layer 105 and the second constrained layer 107 have mutually different thicknesses. The performance of the damper 100 can be affected by the thicknesses of the first constrained layer 105 and the second constrained layer 107. In this regard, the HDD 10 enables appropriate setting of the performance of the damper 100.

Second Embodiment

Hereinafter, a second embodiment will be described with reference to FIGS. 8 to 10. In the following description of the embodiment, components having functions similar to those of the components already described are denoted by the same reference numerals as those of the components already described, and the description thereof may be omitted. In addition, the plurality of components denoted by the same reference numerals do not necessarily have all the functions and properties in common, and may have different functions and properties according to each embodiment.

Figure 8:
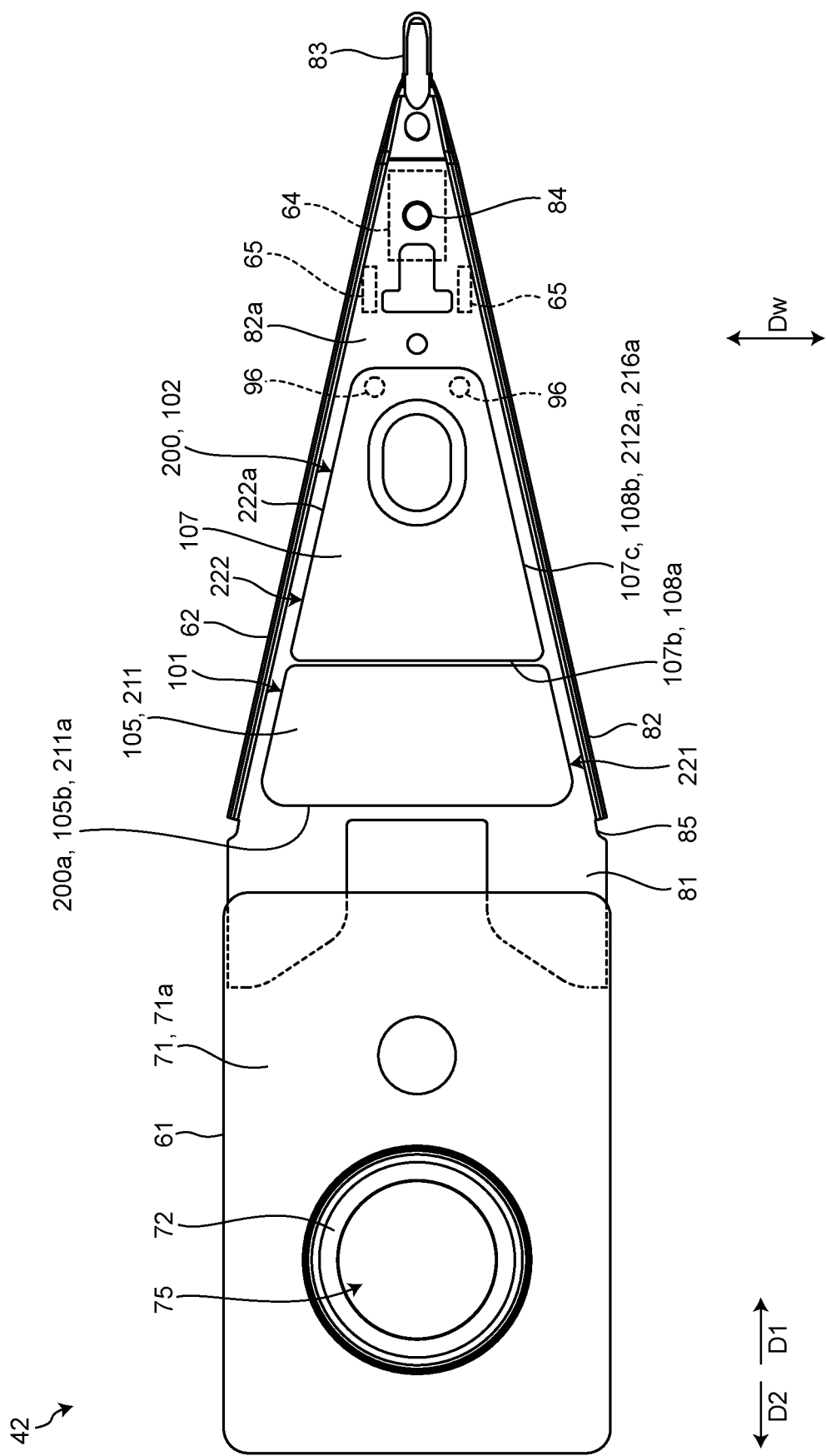
FIG. 8 is an exemplary plan view illustrating an HGA of a second embodiment.

FIG. 8 is an exemplary plan view illustrating the HGA 42 of a second embodiment. As illustrated in FIG. 8, the HGA 42 of the second embodiment includes a damper 200 instead of the damper 100. The damper 200 is substantially equal to the damper 100 except as described below.

Figure 9:
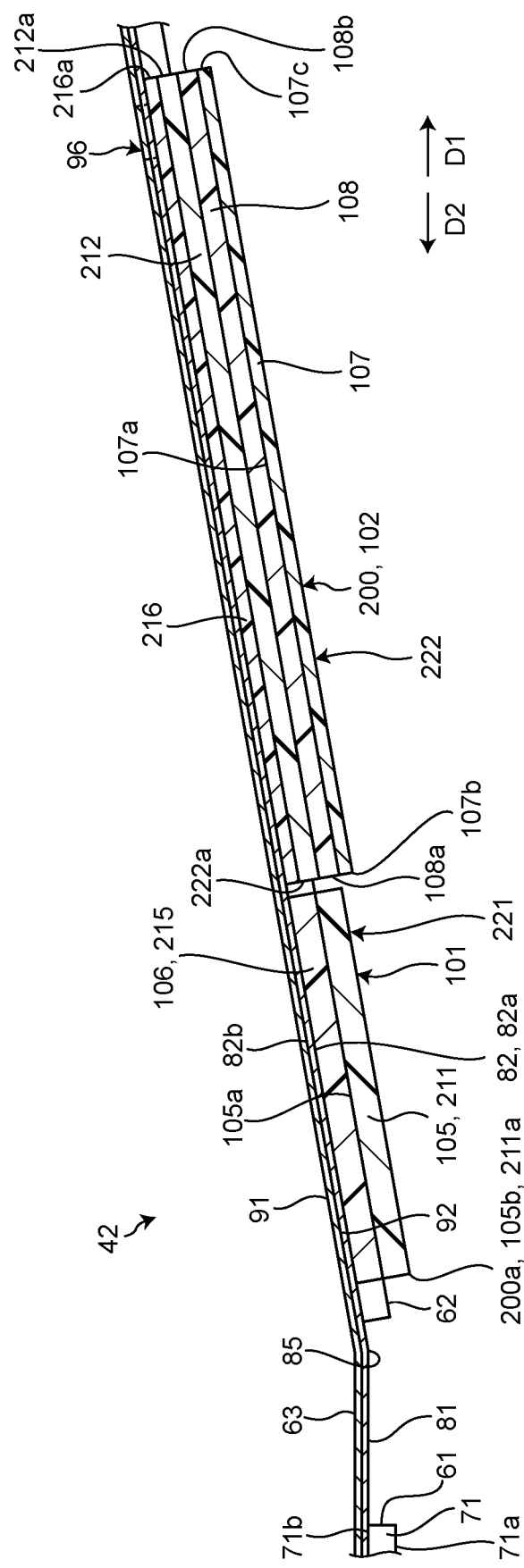
FIG. 9 is an exemplary cross-sectional view illustrating a part of the HGA of the second embodiment.

FIG. 9 is an exemplary cross-sectional view illustrating a part of the HGA 42 of the second embodiment. As illustrated in FIG. 9, in the second embodiment, the first constrained layer 105 is divided into a first member 211 and a second member 212. That is, the first constrained layer 105 includes the first member 211 and the second member 212.

The first member 211 and the second member 212 are, for example, plates made of resin or metal and disposed along the inner side surface 82a of the extending part 82. The material of the first member 211 may be different from or the same as the material of the second member 212. The second member 212 is separated from the first member 211 in the first direction D1 via a gap.

In the direction orthogonal to the inner side surface 82a of the extending part 82, the thickness of the first member 211 is different from the thickness of the second member 212. The thickness of the first member 211 and the thickness of the second member 212 may be the same.

In the second embodiment, the first viscoelastic material 106 is divided into a first intermediate material 215 and a second intermediate material 216. That is, in the damper 200, the first viscoelastic material 106 includes the first intermediate material 215 and the second intermediate material 216.

The first intermediate material 215 and the second intermediate material 216 are viscoelastic materials (VEM). The first intermediate material 215 is interposed between the first member 211 and the inner side surface 82a of the extending part 82. The second intermediate material 216 is interposed between the second member 212 and the inner side surface 82a. Therefore, the second intermediate material 216 is separated from the first intermediate material 215 in the first direction D1 via a gap.

The second damper 102 is attached to the second member 212 of the first damper 101. That is, the second viscoelastic material 108 is interposed between the second member 212 and the second constrained layer 107. The second viscoelastic material 108 is separated from the first member 211 and the first intermediate material 215.

In the direction orthogonal to the inner side surface 82a of the extending part 82, the thickness of the first intermediate material 215 is different from the thickness of the second intermediate material 216. The thickness of the first intermediate material 215 and the thickness of the second intermediate material 216 may be the same.

The damper 200 is divided into a single-layer damper 221 and a multilayer damper 222 by dividing the first constrained layer 105 and the first viscoelastic material 106. In other words, the damper 200 includes the single-layer damper 221 and the multilayer damper 222.

The single-layer damper 221 includes the first member 211 and the first intermediate material 215. That is, the single-layer damper 221 includes a part of the first damper 101 but does not include the second damper 102. Therefore, the first member 211 is exposed without being covered with either the second constrained layer 107 or the second viscoelastic material 108.

The multilayer damper 222 includes the second member 212, the second intermediate material 216, the second constrained layer 107, and the second viscoelastic material 108. That is, the multilayer damper 222 includes a part of the first damper 101 and the second damper 102. The multilayer damper 222 is separated from the single-layer damper 221 in the first direction D1.

When viewed in the direction orthogonal to the inner side surface 82a, the projection surfaces of the second member 212, the second intermediate material 216, the second constrained layer 107, and the second viscoelastic material 108 are substantially equal to each other and overlap each other in the direction orthogonal to the inner side surface 82a. Therefore, the edge 107c of the second constrained layer 107, the edge 108b of the second viscoelastic material 108, the edge 212a of the second member 212, and the edge 216a of the second intermediate material 216 overlap in the direction orthogonal to the inner side surface 82a.

The edges 107c, 108b, 212a, and 216a of the second constrained layer 107, the second viscoelastic material 108, the second member 212, and the second intermediate material 216 form the edge 222a of the multilayer damper 222 that is substantially flat in a direction orthogonal to the inner side surface 82a. The positions and shapes of the edges 107c, 108b, 212a, and 216a may be different from each other.

In the direction orthogonal to the inner side surface 82a, the thickness of the first intermediate material 215 is larger than the thickness of the second intermediate material 216. In the direction orthogonal to the inner side surface 82a, the thickness of the multilayer damper 222 is larger than the thickness of the single-layer damper 221. In other words, in the direction orthogonal to the inner side surface 82a, the sum of the thicknesses of the second member 212, the second intermediate material 216, the second constrained layer 107, and the second viscoelastic material 108 is larger than the sum of the thicknesses of the first member 211 and the first intermediate material 215.

The end 211a of the first member 211 in the second direction D2 forms the end 105b of the first constrained layer 105 in the second direction D2. Therefore, the end 107b of the second constrained layer 107 in the second direction D2 is separated from the axis Ax2 in the first direction D1 more than the end 211a of the first member 211 in the second direction D2.

FIG. 10 is an exemplary cross-sectional view illustrating the HGA 42 and the arm 52 in the manufacturing process of the second embodiment. As illustrated in FIG. 10, when the separate pin SP inclines the HGA 42, the two HGAs 42 are closest to each other at the end 200a of the damper 200 in the second direction D2.

The single-layer damper 221 is located at the end 200a of the damper 200 in the second direction D2. Therefore, the thickness of the end 200a of the damper 200 is relatively small in the direction orthogonal to the inner side surface 82a of the extending part 82. Since the thickness of the end 200a of the damper 200 is small, the distance between the dampers 200 of the two HGAs 42 is set to be relatively large. Therefore, the two HGAs 42 arranged on the common arm 52 can be prevented from interfering with each other.

According to the HDD 10 of the second embodiment described above, the first constrained layer 105 includes the first member 211 and the second member 212 located apart from the first member 211 with a gap in the first direction D1. The first viscoelastic material 106 includes the first intermediate material 215 and the second intermediate material 216. The first intermediate material 215 is interposed between the first member 211 and the inner side surface 82a. The second intermediate material 216 is apart from the first intermediate material 215 with a gap in the first direction D1, and is interposed between the second member 212 and the inner side surface 82a. The second viscoelastic material 108 is interposed between the second member 212 and the second constrained layer 107 and is apart from the first member 211. The end 211a of the first member 211 and the end 107b of the second constrained layer 107 are in the second direction D2. The end 107b of the second constrained layer 107 is further away from the axis Ax2 than the end 211a of the first member 211 in the first direction D1. That is, the single-layer damper 221 including the first member 211 and the second intermediate material 216 and the multilayer damper 222 including the second member 212, the second intermediate material 216, the second constrained layer 107, and the second viscoelastic material 108 are both attached to the inner side surface 82a with spacing therebetween. This makes it possible to separately manufacture the single-layer damper 221 and the multilayer damper 222d. As such, the damper 200 can be easily formed as compared with the second damper 102 attached to the first damper 101, resulting in facilitating the manufacture of the HDD 10.

In the direction orthogonal to the inner side surface 82a, the first intermediate material 215 and the second intermediate material 216 have mutually different thicknesses. The single-layer damper 221 and the multilayer damper 222 can be affected by the thicknesses of the first intermediate material 215 and the second intermediate material 216 (viscoelastic materials) in terms of their performance. In this regard, the HDD 10 enables appropriate setting of the performance of the single-layer damper 221 and the multilayer damper 222.

In the direction orthogonal to the inner side surface 82a, the first intermediate material 215 is larger in thickness than the second intermediate material 216. In the direction orthogonal to the inner side surface 82a, the total thickness of the second member 212, the second intermediate material 216, the second constrained layer 107, and the second viscoelastic material 108 is larger than the total thickness of the first member 211 and the first intermediate material 215. As a result, the HDD 10 allows the single-layer damper 221 of a relatively large size, resulting in improvement in performance of the single-layer damper 221. Furthermore, in the HDD 10, the single-layer damper 221 has a smaller thickness than the multilayer damper 222, which leads to preventing the interference between the dampers 200 of the two HGAs 42.

The edge 107c of the second constrained layer 107 and the edge 212a of the second member 212 overlap each other in the direction orthogonal to the inner side surface 82a. That is, the projection surface of the second constrained layer 107 and the projection surface of the second member 212 substantially coincide with each other in the direction orthogonal to the inner side surface 82a. This makes it possible to easily form the multilayer damper 222 including the second member 212, the second intermediate material 216, the second constrained layer 107, and the second viscoelastic material 108 by punching, for example. As such, the multilayer damper 222 can be easily formed, resulting in facilitating the manufacture of the HDD 10.

In the above description, "prevent" is defined as, for example, preventing the occurrence of an event, an action, or an influence, or reducing the degree of the event, the action, or the influence. Furthermore, in the above description, the "restrict" is defined as, for example, preventing movement or rotation, or allowing movement or rotation within a predetermined range and preventing movement or rotation beyond the predetermined range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a magnetic disk;
   an arm configured to rotate about a rotation axis;
   a base plate having a first surface facing the arm, and attached to the arm away from the rotation axis in a first direction orthogonal to the rotation axis;
   a load beam attached to the base plate, and having:
      a second surface facing the magnetic disk, and
      a third surface opposite the second surface and inclined with respect to the first surface so as to be closer to the magnetic disk as is further away from the arm;
   a flexure attached to the second surface;
   a magnetic head mounted on the flexure further away from the rotation axis than the base plate in the first direction, and configured to read and write information from and to the magnetic disk; and
   a damper attached to the third surface, and including:
      a first constrained layer, and a second constrained layer being located further away from the load beam than the first constrained layer, wherein an end of the second constrained layer is located further away from the rotation axis than an end of the first constrained layer in the first direction, the ends of the first constrained layer and the second constrained layer being in a second direction opposite to the first direction.

2. The disk device according to claim 1, wherein the damper includes:
   a first viscoelastic material interposed between the first constrained layer and the third surface, and
   a second viscoelastic material interposed between the first constrained layer and the second constrained layer, and
an end of the second viscoelastic material is located further away from the rotation axis than an end of the first viscoelastic material in the first direction, the ends of the first viscoelastic material and the second viscoelastic material being in the second direction.

3. The disk device according to claim 1, wherein the first constrained layer has a first attached surface facing the third surface,
the second constrained layer has a second attached surface facing the first constrained layer, and
the second attached surface is smaller in size than the first attached surface.

4. The disk device according to claim 2, wherein the first constrained layer includes:
   a first member, and
   a second member being apart from the first member with a gap in the first direction,
the first viscoelastic material includes:
   a first intermediate material interposed between the first member and the third surface, and
   a second intermediate material being apart from the first intermediate material with a gap in the first direction and interposed between the second member and the third surface,
the second viscoelastic material is interposed between the second member and the second constrained layer away from the first member, and
the end of the second constrained layer is further away from the rotation axis than an end of the first member in the first direction, the end of the first member being in the second direction.

5. The disk device according to claim 4, wherein in a direction orthogonal to the third surface, the first intermediate material is different in thickness from the second intermediate material.

6. The disk device according to claim 5, wherein in the direction orthogonal to the third surface, the first intermediate material is larger in thickness than the second intermediate material, and
in the direction orthogonal to the third surface, a total thickness of the second member, the second intermediate material, the second constrained layer, and the second viscoelastic material is larger than a total thickness of the first member and the first intermediate material.

7. The disk device according to claim 4, wherein the second constrained layer and the second member overlap each other at an edge in a direction orthogonal to the third surface.

8. The disk device according to claim 2, further comprising:
   a piezoelectric element mounted on the flexure.

9. The disk device according to claim 8, further comprising:
   a plurality of joints where the load beam and the flexure are joined together, the plurality of joints being located between the base plate and the piezoelectric element, wherein
the second constrained layer covers a closest one of the plurality of joints relative to the piezoelectric element via the first constrained layer, the first viscoelastic material, and the second viscoelastic material.

10. The disk device according to claim 2, wherein the first viscoelastic material is made of a different material from the second viscoelastic material.

11. The disk device according to claim 2, wherein a difference in viscosity between the first viscoelastic material and the second viscoelastic material differs at a first temperature and at a second temperature different from the first temperature.

12. The disk device according to claim 2, wherein in a direction orthogonal to the third surface, the first viscoelastic material is different in thickness from the second viscoelastic material.

13. The disk device according to claim 1, wherein in a direction orthogonal to the third surface, the first constrained layer is different in thickness from the second constrained layer.

14. A head gimbal assembly comprising:
a base plate having a first outer surface extending in a first direction, a second outer surface opposite the first outer surface, and a protrusion protruding from the first outer surface;
a load beam attached to the base plate, and having:
   a third outer surface extending from the base plate in a first inclined direction that is inclined with respect to the first direction and facing a second inclined direction that is perpendicular to the first inclined direction and
   a fourth outer surface opposite the third outer surface;
a flexure attached to the fourth outer surface;
a magnetic head mounted on the flexure away from the base plate in the first direction; and
a damper attached to the third outer surface, and including:
   a first constrained layer, and
   a second constrained layer being located further away from the load beam than the first constrained layer, wherein an end of the second constrained layer is further away from the base plate than an end of the first constrained layer in the first direction, the ends of the first constrained layer and the second constrained layer being in a second direction opposite to the first direction.

* * * * *